(12) United States Patent
Deshkar et al.

(10) Patent No.: US 9,003,159 B2
(45) Date of Patent: Apr. 7, 2015

(54) DATA CACHING IN NON-VOLATILE MEMORY

(75) Inventors: Shekhar S. Deshkar, Pune (IN);
Sandeep Karmarkar, Pune (IN);
Arvind Pruthi, Los Gatos, CA (US);
Ram Kishore Johri, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 821 days.

(21) Appl. No.: 12/898,483

(22) Filed: Oct. 5, 2010

(65) Prior Publication Data
US 2011/0082967 A1    Apr. 7, 2011

Related U.S. Application Data

(60) Provisional application No. 61/248,845, filed on Oct. 5, 2009.

(51) Int. Cl.
*G06F 12/00* (2006.01)
*G06F 12/08* (2006.01)
*G06F 12/02* (2006.01)
G06F 13/00 (2006.01)
G06F 13/28 (2006.01)

(52) U.S. Cl.
CPC ........ *G06F 12/0873* (2013.01); *G06F 12/0246* (2013.01); *G06F 12/0292* (2013.01); *G06F 2212/222* (2013.01); *G06F 2212/261* (2013.01)

(58) Field of Classification Search
USPC .................. 711/103, 113, 202, 135; 707/813
See application file for complete search history.

(56) References Cited

U.S. PATENT DOCUMENTS

| | | | |
|---|---|---|---|
| 6,347,358 B1 * | 2/2002 | Kuwata | 711/113 |
| 7,506,098 B2 | 3/2009 | Arcedera et al. | |
| 7,610,458 B2 * | 10/2009 | Arimilli et al. | 711/158 |
| 7,613,876 B2 | 11/2009 | Bruce | |
| 2007/0094440 A1 * | 4/2007 | Torabi | 711/103 |
| 2007/0204107 A1 * | 8/2007 | Greenfield et al. | 711/128 |
| 2008/0016315 A1 * | 1/2008 | Cohen et al. | 711/207 |
| 2008/0162864 A1 * | 7/2008 | Sugumar et al. | 711/173 |

(Continued)

FOREIGN PATENT DOCUMENTS

| | | |
|---|---|---|
| EP | 1804168 | 7/2007 |
| TW | 200809495 | 2/2008 |
| WO | 2007146845 | 12/2007 |

OTHER PUBLICATIONS

Yiming Hu & Tycho Nightingale & Qing Yang; "RAPID-Cache—A Reliable and Inexpensive Write Cache for High Performance Storage Systems," IEEE Transactions on Parallel and Distrubted Systems, vol. 13, No. 2, pp. 1-18 (2002).

(Continued)

*Primary Examiner* — Yaima Rigol
*Assistant Examiner* — Mark Giardino, Jr.

(57) ABSTRACT

Methods, systems, and apparatus, including computer programs encoded on a computer storage medium, can perform data caching. In some implementations, a method and system include receiving information that includes a logical address, allocating a physical page in a non-volatile memory structure, mapping the logical address to a physical address of the physical page, and writing, based on the physical address, data to the non-volatile memory structure to cache information associated with the logical address. The logical address can include an identifier of a data storage device and a logical page number.

11 Claims, 10 Drawing Sheets

(56) References Cited

U.S. PATENT DOCUMENTS

2009/0193182 A1* 7/2009 Nitta .......................... 711/103
2010/0185806 A1 7/2010 Pruthi et al.
2010/0306467 A1 12/2010 Pruthi et al.

OTHER PUBLICATIONS

Yiming Hu & Tycho Nightingale & Qing Yang; "RAPID-Cache—A Reliable and Inexpensive Write Cache for High Performance Storage Systems," Technical Report No. 1198-0001, University of Rhode Island, Department of Electrical and Computer Engineering, Kingston, RI, pp. 1-16 (2001).

Yiming Hu & Tycho Nightingale & Qing Yang; "RAPID-Cache—A Reliable and Inexpensive Write Cache for Disk I/O Systems," in proceedings of the 5th International Symposium on High Performance Computer Architecture (HPCA-5), Orlando, FL, pp. 1-10 (1999).

Knutsson, Frederic, Authorized Officer, European Patent Office, PCT International Application No. PCT/US2010/051514, filed Oct. 5, 2010, in International Search Report, mailed Feb. 7, 2011, to be published by WIPO, 11 pages.

Chinese Patent Application No. 201080044714.2, Notification of the First Office Action, dated May 22, 2014, 11 pages.

* cited by examiner

DATA CACHING IN NON-VOLATILE MEMORY

CROSS REFERENCE TO RELATED APPLICATION

This application claims the benefit of the priority of U.S. Provisional Application Ser. No. 61/248,845, filed Oct. 5, 2009 and entitled "Flash Based Cache with a Cache Aware Flash Translation Layer." The content of the above application is incorporated by reference in its entirety.

BACKGROUND

The present disclosure describes systems and techniques relating to data caching.

A host system can communicate with a storage system to read and write data. A host system can include a computer system, such as a personal computer, a consumer electronics device, or a server system. A storage system can include one or more data storage devices such as a hard disk drive (HDD) or a solid state drive (SSD) communicating with the host system. In some implementations, a host system includes the storage system, and in other implementations, the storage system is external to the host system. A storage system can perform data caching to decrease average access latency times.

SUMMARY

The present disclosure includes systems and techniques relating to data caching. According to an aspect of the described systems and techniques, a system includes a host system, a data storage device, a non-volatile memory structure that is configured to cache data with respect to the data storage device, and a controller configured to operate devices such as the data storage device. The controller can receive a logical address from the host system, allocate a physical page in the non-volatile memory structure, store a mapping from the logical address to a physical address of the physical page, receive data associated with the logical address, and write, based on the physical address, the data associated with the logical address to the non-volatile memory structure to cache the data associated with the logical address. The mapping can indicate a cached status of the data associated with the logical address.

In some implementations, a controller is configured to receive the data associated with the logical address from one of the host system or the data storage device. In some implementations, a controller is configured to invalidate the mapping based on the data associated with the logical address being written to a different physical page. A controller can perform an erasure of a physical page associated with an invalidated mapping to make the physical page available for re-allocation. In some implementations, a controller is configured to invalidate an allocated physical page based a logical address indicated by an invalidate command sequence. In some implementations, a logical address includes an identifier of a data storage device and a logical page number. A system can include two or more data storage devices. The non-volatile memory structure can be configured to cache data with respect to the two or more data storage devices. A mapping can include a data storage device identifier that identifies at least one of the two or more data storage devices. In some implementations, the controller includes a storage controller and a cache controller, and the cache controller is communicatively coupled with the non-volatile memory structure. A non-volatile memory structure can include one or more flash memory structures. A data storage device can include one or more hard disk drives. A system can include caching devices that include non-volatile memory structures. In some implementations, the controller is configured to select a caching device based on the logical address.

According to another aspect of the described systems and techniques, a method includes receiving, from a host system, information that includes a logical address. The method includes receiving data associated with the logical address from one of the host system or a data storage device. The method includes allocating a physical page in a non-volatile memory structure. In some implementations, the non-volatile memory structure is configured to cache data with respect to at least one data storage device. The method includes storing a mapping from the logical address to a physical address of the physical page. The method includes writing, based on the physical address, the data associated with the logical address to the non-volatile memory structure to cache the data associated with the logical address. The mapping can indicate a cached status of the data associated with the logical address.

In some implementations, a method includes invalidating the mapping based on the data associated with the logical address being written to a different physical page and performing an erasure of the physical page associated with the invalidated mapping to make the physical page available for re-allocation. Receiving data associated with the logical address can include reading data from the data storage device based on the logical address. In some implementations, a method includes invalidating an allocated physical page based a logical address indicated by an invalidate command sequence.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

An apparatus can include a non-volatile memory structure, circuitry to receive a command sequence that includes a logical address, circuitry to receive data associated with the logical address, circuitry to allocate a physical page in the non-volatile memory structure, circuitry to store a mapping from the logical address to a physical address associated with the physical page, and circuitry to write, based on the physical address, the data associated with the logical address to the non-volatile memory structure to cache the data associated with the logical address. The mapping can indicate a cached status of the data associated with the logical address. The logical address can include information that identifies a data storage device and a logical page number.

In some implementations, an apparatus can include circuitry to receive a read command sequence that includes a logical address, circuitry to identify a physical address associated with the logical address of the read command sequence, and circuitry to read, based on the identified physical address, data from the non-volatile memory structure to provide cached data associated with the logical address of the read command sequence. An apparatus can include circuitry to invalidate an allocated physical page based a logical address indicated by an invalidate command sequence.

The described systems and techniques can result in a reduced latency storage system. For example, using a mapping that relates a logical address to a physical address of a page on a non-volatile memory can reduce a number of lookups required to read data from a cache data store. In addition, rather than maintaining multiple separate lookup tables, a single lookup table can be employed to more efficiently use memory in a cache data store. This approach to data caching in a storage system can result in reduced latency.

Details of one or more implementations are set forth in the accompanying drawings and the description below. Other features, objects, and advantages may be apparent from the description and drawings, and from the claims.

DRAWING DESCRIPTIONS

Like reference symbols in the various drawings indicate like elements.

DETAILED DESCRIPTION

Figure 1:
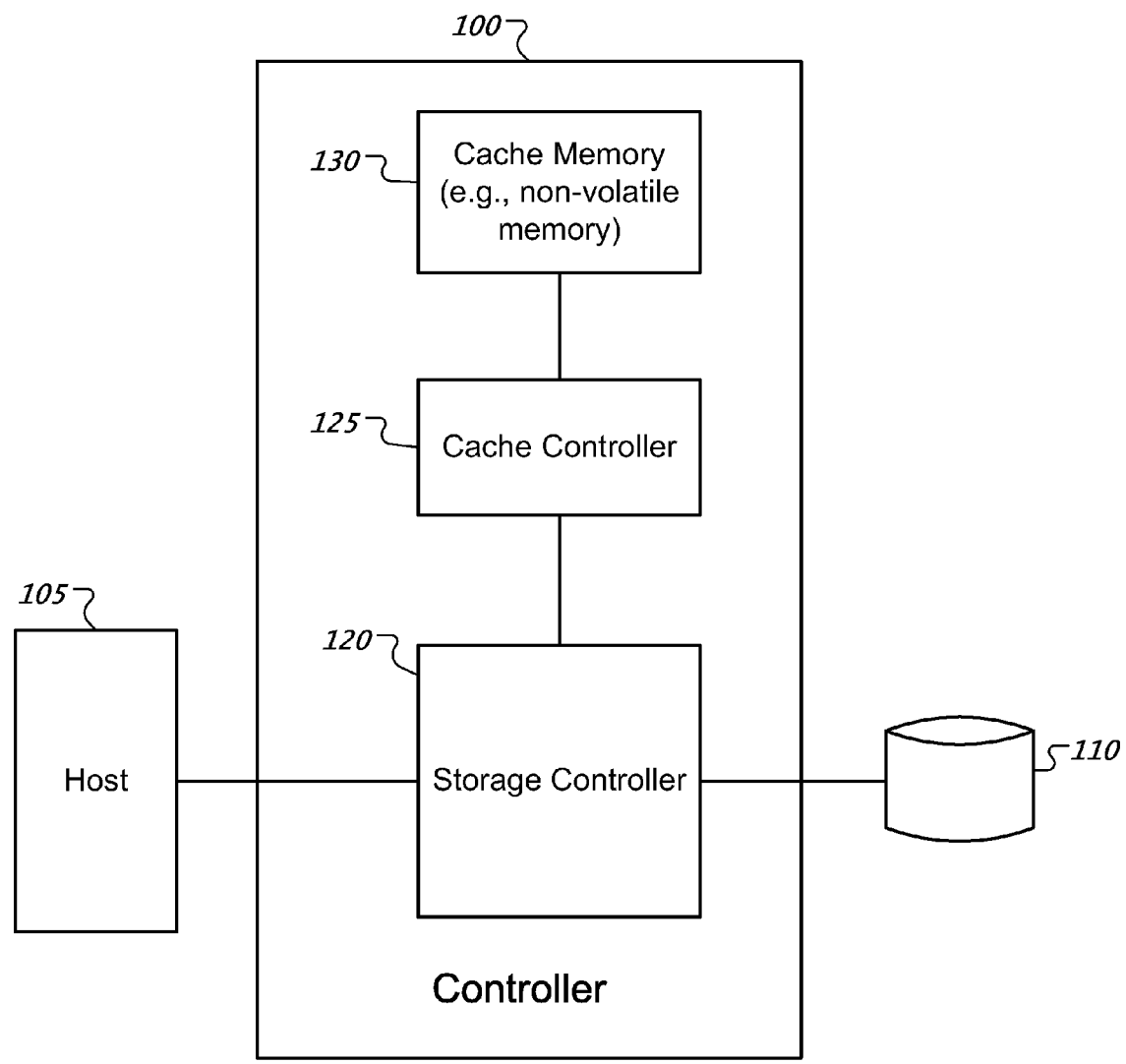
FIG. 1 shows an example of a storage architecture.

FIG. 1 shows an example of a storage architecture. A host 105 can access one or more storage devices 110 via a controller 100. A controller 100 can include a storage controller 120, a cache controller 125, and one or more memories such as a cache memory 130. In some implementations, a storage device 110 includes one or more storage elements that are separately addressable by the controller 100.

A host 105 can send a command sequence such as a write command sequence or a read command sequence to the storage controller 120. A command sequence can include a logical address. In some implementations, a logical address includes a storage device target identifier that is associated with a storage device 110. In some implementations, a command sequence can include a command identifier, a logical address, and a length. In some implementations, a host 105 communicates with a storage controller 120 via an interface such as a Peripheral Component Interconnect (PCI), Serial Advanced Technology Attachment (SATA), Small Computer System Interface (SCSI), Serial Attached SCSI (SAS), Ethernet, or Universal Serial Bus (USB).

A storage controller 120 can communicate with a cache controller 125 to cache data received from a storage device 110, cache data received from the host 105, or both. The cache controller 125 can communicate with a cache memory 130, which can include non-volatile memory such as flash memory. In some implementations, the cache controller 125 includes a flash memory controller to control flash memory in the cache memory 130. For example, a storage controller 120 can read data from a storage device 110 and store at least a portion of the read data in a cache memory 130 controlled by a cache controller 125. In another example, a storage controller 120 can receive data from a host 105 for writing to a storage device 110. A storage controller 120 can store write data, received from the host 105, in a cache memory 130 controlled by a cache controller 125. In some implementations, a storage controller 120 stores host write data on a cache memory 130 and is not required to immediately store the host write data on a storage device 110. In some implementations, a storage controller 120 stores host write data on a cache memory 130 and on a storage device 110.

A host 105 can include one or more processors, memory, and input/output (I/O) connections. In some implementations, a host 105 includes a storage controller 120. For example, a system-on-a-chip (SOC) can include a general purpose processor and one or more controllers (e.g., storage controller, cache controller, or a combination thereof) to access external devices such as hard disk drives (HDDs) or solid-state drives (SSDs). A SSD can include one or more non-volatile memory structures such as a non-volatile memory integrated circuit, e.g., flash chip. A cache controller 125 can include one or more processors and one or more non-volatile memory. In some implementations, a storage controller 120 includes one or more cache controllers 125. In some implementations, a storage controller 120 is integrated with a cache controller 125 and one or more storage devices 110.

Figure 2:
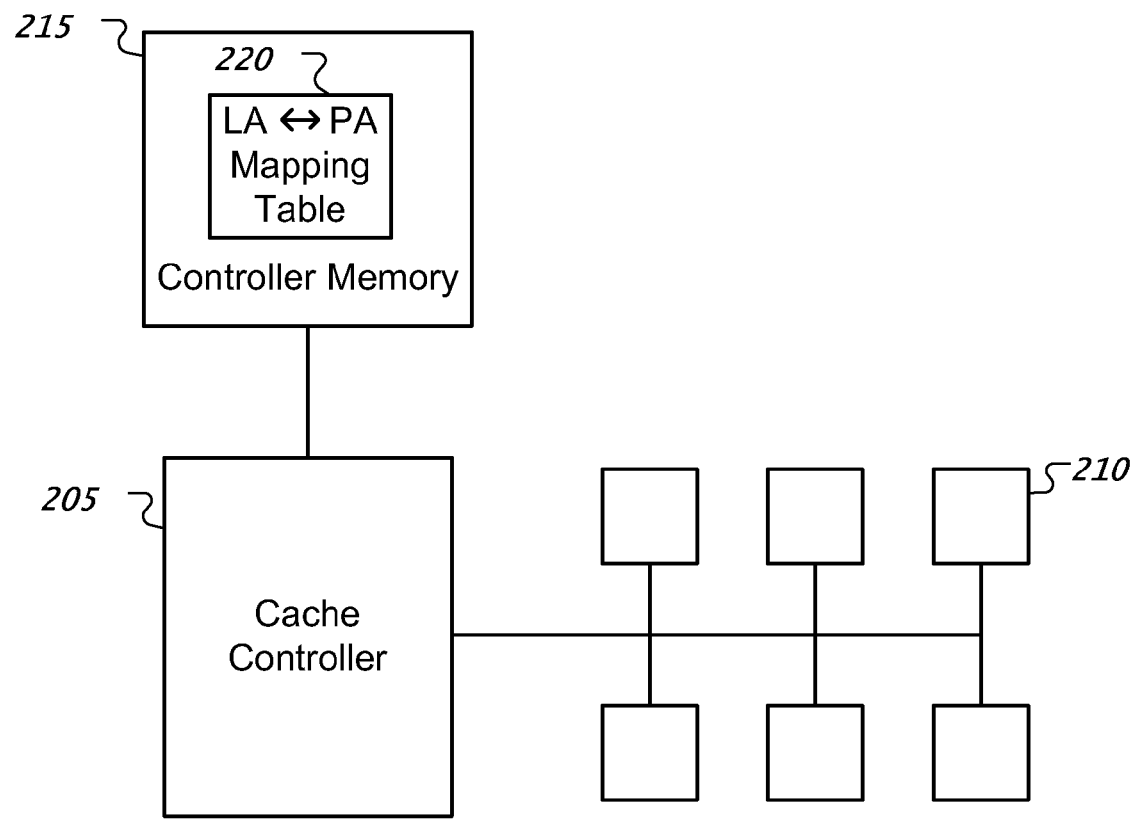
FIG. 2 shows an example of a cache controller architecture.

FIG. 2 shows an example of a cache controller architecture. A cache controller 205 can cache data for a storage controller. Caching data can increase performance, e.g., faster read times and faster write times. A cache controller 205 can communicate with one or more non-volatile memory chips such as flash chips 210 to store or retrieve cache data. A cache controller 205 can communicate with a controller memory 215, which stores cache metadata such as address mappings for cached data in the flash chips 210. In some implementations, a controller memory 215 is integrated into a memory region of a flash chip 210, e.g., a portion of memory in a flash chip is configured as a memory for the cache controller 205.

The cache controller 205 can store information such as cache metadata on the controller memory 215. For example, the cache controller 205 can store one or more mappings in a mapping table 220 to facilitate caching operations. A mapping, stored on the mapping table 220, identifies a relationship between a logical address (LA) and a physical address (PA) corresponding to a physical page stored on at least one of the flash chips 210. A logical address can include a logical page number (LPN) associated with a data location on a storage device. In some implementations, a LPN can be referred to as a logical block address (LBA). In some implementations, a LPN can include an offset and a length. A physical address can include a block identifier and a page identifier.

In some implementations, a mapping table 220 can include logical addresses that include a LPN and a storage device target identifier that is associated with a data storage device. A storage device target identifier can differentiate identical LPNs. For example, two data storages devices can store different data using identical LPNs. A controller can use a storage device target identifier to retrieve data associated with a LPN from a corresponding storage device.

The cache controller 205 can receive a command sequence from a storage controller to retrieve data from cache. The command sequence can identify a logical address. If the cache controller 205 has a cache hit, e.g., the command sequence's logical address is found in the mapping table 220, then the cache controller 205 uses the corresponding physical address to retrieve data from a flash chip 210 corresponding to the physical address. The cache controller 205 can send the retrieved data to the storage controller.

If the cache controller 205 has a cache miss, e.g., a command's logical address is not found in the mapping table 220, then the cache controller 205 can report the miss to a storage controller. In some implementations, the cache controller 205 can report the miss to a program such as firmware. However, the cache controller 205 can allocate a physical page in a flash chip 210 to store a mapping in the mapping table 220 that identifies a relationship between the command's logical address and a physical address of the allocated physical page. After the storage controller services the cache miss, e.g., retrieves data corresponding to the logical address from a storage device, the cache controller 205 can receive the data and store the data in one or more of the flash chips 210 for a future read access.

In another example, the cache controller 205 receives a command to write data to the cache. The command identifies a logical address. If the cache controller 205 has a cache hit, the cache controller 205 uses a corresponding physical address to write data to a flash chip 210 corresponding to the physical address. In some implementations, a new location is required for a future write to the same physical page. Therefore, the cache controller 205 can allocate a new physical page and update the mapping table 220 to reflect the new physical page assignment for the logical address. In some implementations, the cache controller 205 can mark the old physical page invalid.

Figure 3:
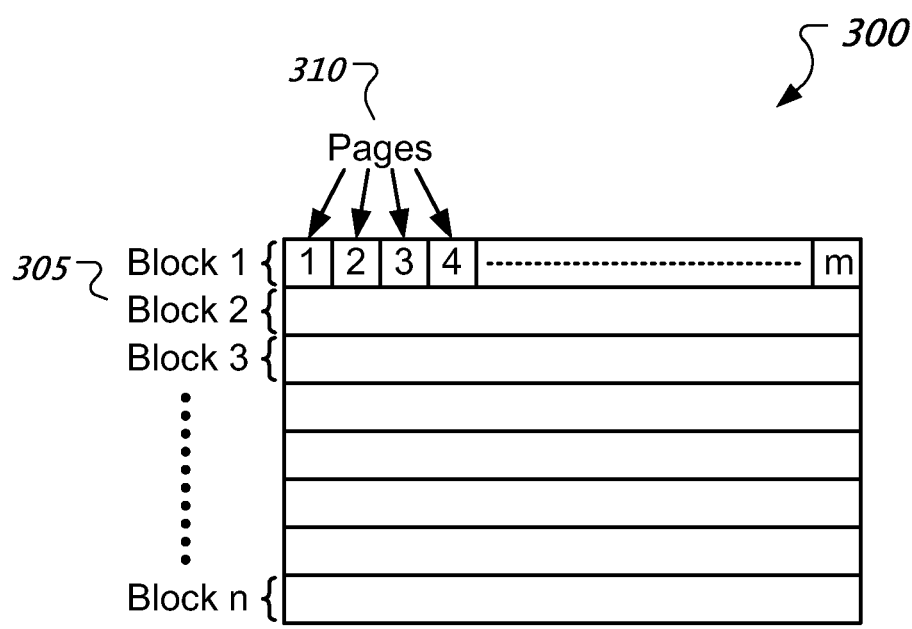
FIG. 3 shows an example of a block and page layout of a non-volatile memory.

FIG. 3 shows an example of a block and page layout of a non-volatile memory. A non-volatile memory layout 300 includes one or more blocks 305. A block 305 includes one or more pages 310. For example, a block can be 256 KB in size and a page can be 4 KB in size, and accordingly, a block can include 64 pages. In another example, a block can be 512 KB in size and a page can be 4 KB in size, hence, a block can include 128 pages.

A storage controller can receive information, such as a command sequence from a host system. A command sequence can include a logical address. For a write command, a command sequence can include data. In some implementations, a logical address includes an identifier of a data storage device and a logical page number. A storage controller can run a cache based storage process. In some implementations, a storage controller operates a cache controller to run at least a portion of a cache based storage process. For example, the storage controller can send a command sequence to a cache controller based upon a command sequence received from the host system.

Figure 4:
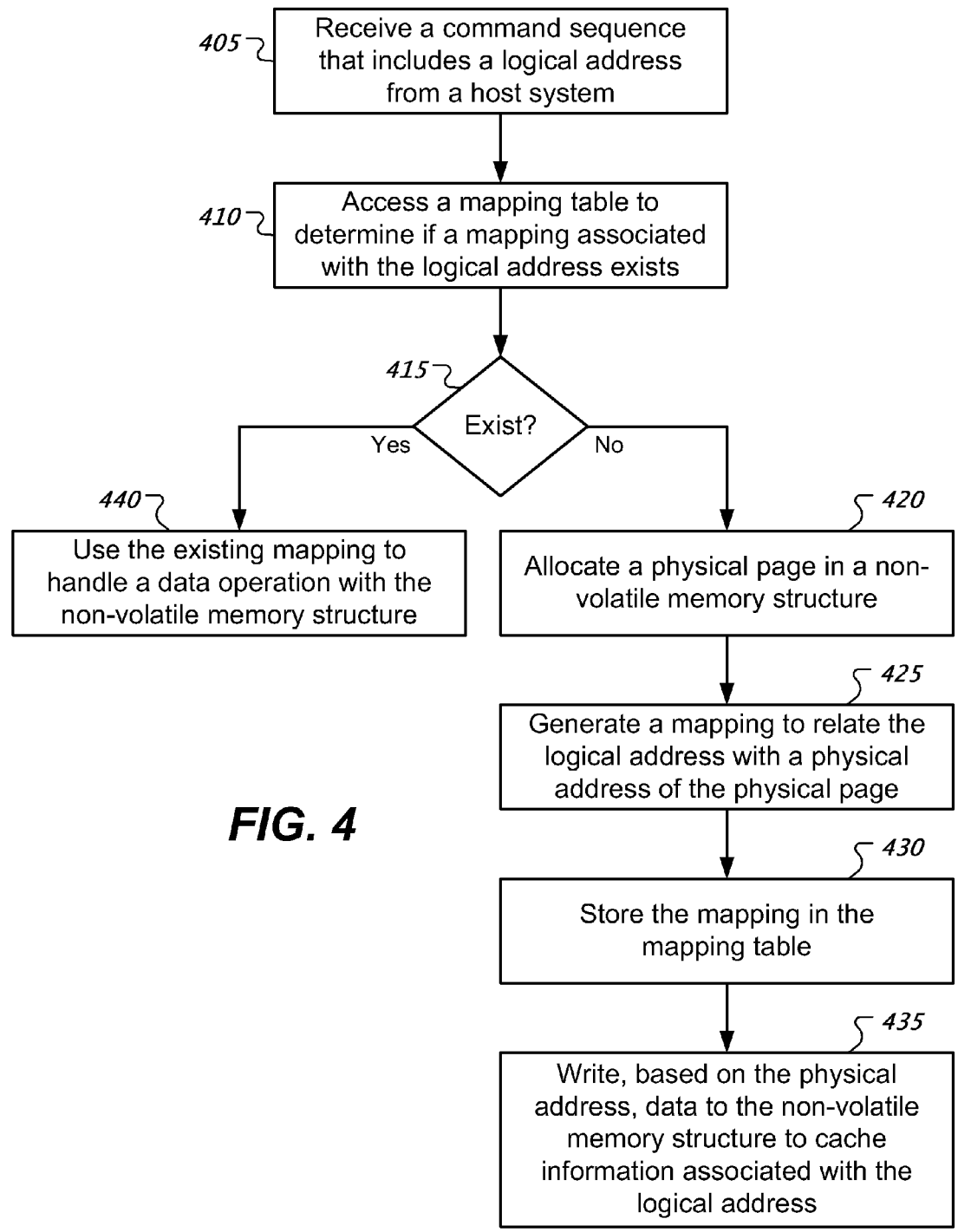
FIG. 4 shows an example of a cache based storage process.

FIG. 4 shows an example of a cache based storage process. In some implementations, a cache based storage process includes operations for a storage controller and operations for a cache controller that is in communication with the storage controller. In some implementations, the process runs on a controller such as a storage controller or an integrated storage and cache controller. At 405, a cache based storage process can receive a command sequence that includes a logical address from a host system. In some cases, a command sequence indicates that data are to be retrieved for the host system. In some cases, a command sequence indicates a write operation and includes host write data.

At 410, the cache based storage process can access a mapping table to determine if a mapping associated with the logical address exists. For example, the process can perform a table lookup based on the logical address. In some implementations, the process uses a hash table to determine whether a mapping associated with the logical address exists.

In some implementations, a cache controller stores a table in a controller memory and uses the table to perform a lookup based on a logical address.

At 415, if a mapping does not exist, then the process, at 420, can allocate a physical page in a non-volatile memory structure. The process, at 425, can generate a mapping to relate the logical address with a physical address of the physical page. In some implementations, a physical address of a physical page is a starting address of the physical page. At 430, the process can store the mapping in the mapping table. The mapping can be indicative of a cached status of the data associated with the logical address. For example, the existence of a valid mapping table entry can indicate the presence of cached data. At 435, the process can write, based on the physical address, data to the non-volatile memory structure to cache information associated with the logical address. For example, a process can receive a command sequence that includes host write data. The process can cache host write data in the non-volatile memory structure.

At 415, if the mapping does exist, then the process, at 440, can use the existing mapping to handle a data operation with the non-volatile memory structure. Various examples of data operations include a write operation and a read operation. In some implementations, the process uses the existing mapping to read data from the non-volatile memory structure. In some implementations, the process uses the existing mapping to write data to the non-volatile memory structure. In some implementations, using the existing mapping to write data can include invalidating the existing mapping and creating a new mapping to write data to a different physical location in the non-volatile memory structure.

Figure 5:
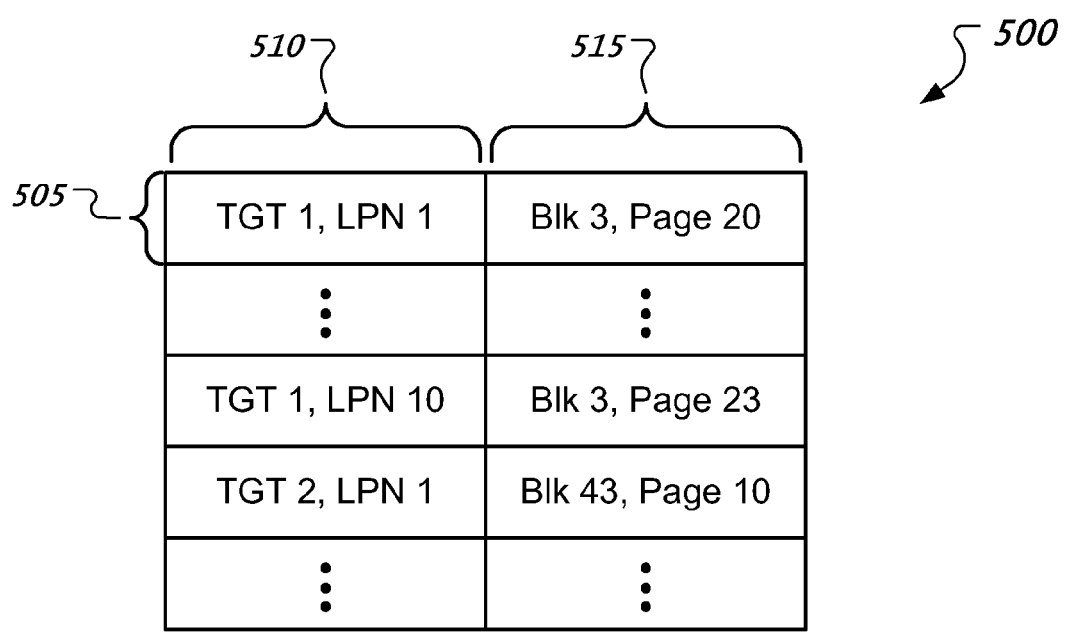
FIG. 5 shows an example of a mapping table layout.

FIG. 5 shows an example of a mapping table layout. A mapping table 500 layout is arranged to store one or more entries 505. A mapping table 500 is partitioned into logical addresses 510 and respective physical addresses 515. For example, an entry 505 includes a logical address 510 and a physical address 515. In some implementations, a logical address includes an identifier such as a target device identifier (e.g., TGT 1, TGT 2) that identifies a target device. For example, a logical address can include a target device identifier and a LPN. With respect to a read command sequence, a controller can read, using a LPN, a page from a device corresponding to a target device identifier included in the sequence. The controller can cache the page. Caching the page can include creating a mapping, in the mapping table 500, that includes the target device identifier and the LPN. In some implementations, an entry 505 includes an active flag to indicate whether the entry 505 is in use. An entry 505 can include a valid flag to indicate whether a physical page associated with a physical address 515 is valid or invalid. For example, an entry 505 is marked as being in use and the valid flag is marked as invalid. An entry 505 that is marked as being in use and the valid flag is marked as valid can indicate a cache status of true.

A storage system can include one or more non-volatile memories configured to cache information flowing to a storage device or coming from a storage device. Non-volatile memories such as flash memory can be electronically erased and reprogrammed. In some implementations, flash memory can include NAND logic.

In some implementations, flash memory operates based on erase blocks and pages. For example, a unit of access is a page, whereas a unit of an erase operation is an erase-block. Sizes of blocks and pages can vary with different flash devices. For example, in relation to a flash device included in a large-block flash SSD, an erase block size is between 256 KB to 512 KB in size and a page is 4 KB in size. However, other sizes are possible.

In some implementations, a flash block, which already contains data, cannot be re-written unless the block is explicitly erased. An erase operation can be time expensive, e.g., can take several milliseconds. In some implementations, for large block NAND devices, the pages within an erase block cannot be written randomly. For example, an erase block includes 100 pages numbered from 1 to 100. In some implementations, if page 20 within the erase block is written, then pages 1-20 cannot be written to unless the entire block is erased. However, pages after page 20 are write-able.

In some flash memory designs, a block can be erased only a finite number of times before it becomes unusable due to one or more physical characteristics of flash memory. A flash memory device can use wear-leveling algorithms to distribute a load on multiple flash chips. A flash memory device can use wear-leveling algorithms to make sure that usage of erase blocks within a flash memory is rotated such that no single flash erase block gets burdened with too many write cycles.

An application may write and subsequently rewrite data to the same logical page. The logical page can be mapped to a physical page stored in a flash memory. Rewriting a page to the same location can require a flash device to read the entire erase block into memory, erase the entire block, rewrite data from memory to pages prior to the page that needs to be updated, update the relevant page, and rewrite the remaining pages in the block to the flash. The operations for rewriting a page to the same location can be expensive in terms of time. Further, there is a possibility of permanent data loss if the flash device is powered off before the rewriting process is completed. However, rewriting in place may not ensure a uniform wear of flash blocks.

A flash device can re-write a page to a different location to increase operational latency and provide a more distributed wear-leveling of the flash memory. For example, a flash device can mark the page as invalid and write the updated page to a different location. In some implementations, a flash device can use an abstraction layer of logical pages on top of the physical space provided by a flash memory structure. The layer is called as a flash translation layer (FTL). In some implementations, commands sent to the flash devices can use logical addresses to refer to data. In some implementations, a command includes a LPN. The FTL can assign a physical page number to a logical page number using logic internal to the FTL. For re-writing, the FTL can be configured to re-write pages to a different location. Hence, a flash may have multiple physical pages that are associated with the same logical page of which only one physical page is deemed valid and the rest are deemed invalid. A flash device can use FTL metadata to track which physical locations contain valid data.

FTL metadata can include a table that stores a mapping table of LPNs and respective physical page locations. In some implementations, a LPN is a logical page address exported via interface such as SAS, SATA, or PCI. The mapping table can maintain the latest physical location that has valid contents for a corresponding LPN. FTL metadata can include a table that describes which physical pages have valid data.

A flash device can perform garbage collection to reclaim invalidated pages such that they can be reused for a future write operation. In some implementations, FTL logic requires a free block to process an update to a logical page. In some implementations, a processor within the flash controller runs a garbage collection process in the background. A garbage collection process can search for erase blocks and run a de-fragmentation operation before making the page available for write. In some implementations, the process searches for blocks based on a number of invalidated pages contained therein. A de-fragmentation process can collect the valid pages from various blocks in memory, rewrite them into a new erase block, update the metadata mapping, and erase the old blocks. The erased blocks are now available for a new write. A flash device can perform on-demand garbage collection in the event that no free physical pages exist to satisfy a write operation. However, to reduce the likelihood of on-demand garbage collection, a flash controller can declare a lesser amount of storage space than what is physically available.

A storage system can include a flash device that is configured as a caching device. A caching device can include a cache-aware FTL. Rather than supporting a direct mapping between LPNs and physical storage space, such as when a flash device is used as a target-device, a caching device can provide caching for multiple target devices with a logical-page range independent of the actual physical space provided by the flash device.

In some implementations, a caching device can provide commands such as GET and SET commands to manipulate the device. Such commands can accept a target device identifier, e.g., TGT-ID, in addition to a logical page address and transfer length fields. In some implementations, a logical address includes a TGT-ID and a logical page number. The TGT-ID can identify a target device associated with data sent or received via a command. A SET operation can include caching the supplied data, identified by offset and length, for a specified TGT-ID. Caching the supplied data can include storing the supplied data on a flash memory structure. A GET operation can include fetching the data identified by an offset and length specified in the GET call for a specified TGT-ID.

A cache aware FTL mapping table can include a mapping of an application specified logical address, such as <TGT-ID, LPN>, to a physical location description within a flash memory structure. A physical location description can identify a flash block and a page within the flash block. In some cases, an entry in a mapping table may include a logical address that does not have a corresponding valid physical page (e.g., a physical location description is marked as "invalid"). Such an entry can be eliminated from the mapping table.

A caching flash device can provide an interface to INVALIDATE a cache mapping. An INVALIDATE command can be used when an application no longer requires a page stored in the cache. A cache aware FTL can track physical page status, e.g., valid or invalid. A cache aware FTL can continue to do garbage collection to maintain a pool of erased blocks.

In response to a GET call, a cache aware FTL can directly lookup an application supplied logical address in the FTL's internal mappings to check if the data exists within the flash. If not, the FTL can send out an error message.

In response to a SET call, a cache aware FTL can check if a free page is available to accommodate an incoming write request indicated by the SET call. If a free page does exist, the FTL can transfer the contents of the data to the available page and create a new entry in the FTL's mapping table to indicate the mapping of this new block. The FTL can invalidate an old mapping, if such a mapping exists. If a page is unavailable, the FTL can wait for a garbage collection process to reclaim pages. In some implementations, if a page is unavailable, the FTL can return back with an error message.

In response to an INVALIDATE call, a cache aware FTL can lookup corresponding logical addresses in the FTL's mapping table, remove these mappings from the mapping table, and can mark corresponding physical pages invalid. A garbage collection process can reclaim pages marked invalid during an INVALIDATE call.

A caching flash device can support several target devices. While a caching flash device can theoretically provide caching for an unlimited amount of physical space, a notion of a ratio of caching space provided by a flash to the physical space for which the flash acts as a cache is useful to understand the device's performance. In some cases, a smaller ratio may lead to a smaller working set in cache and, hence, results in less effective caching.

Figure 6:
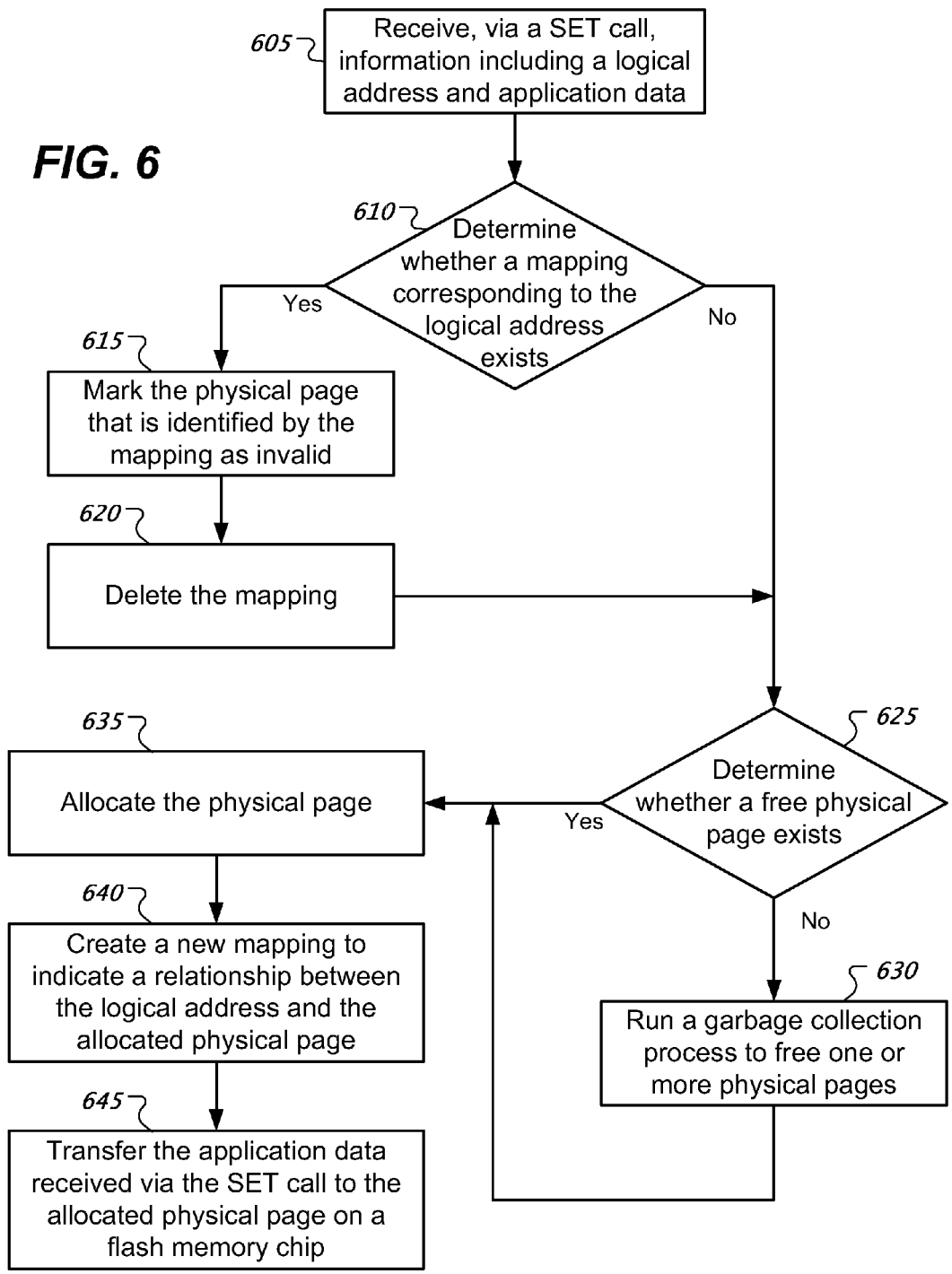
FIG. 6 shows an example of a cache aware flash translation layer process.

FIG. 6 shows an example of a cache aware flash translation layer process. A caching device can run a cache aware flash translation layer process to handle incoming requests such as a SET call. A storage controller can send a SET call to a caching device to cache application data on the caching device. At 605, the process can receive, via a SET call, information including a logical address and application data. At 610, the process determines whether a mapping corresponding to the logical address exists. If the mapping exists, then, the process, at 615, marks the physical page that is identified by the mapping as invalid. At 620, the process deletes the mapping. In some implementations, the process marks an entry that contains the mapping as invalid.

At 625, the process determines whether a free physical page exists. If a free physical page does not exist, then the process runs a garbage collection process to free one or more physical pages at 630. If a free physical page does exist, then, at 635, the process allocates the physical page at 635. At 640, the process creates a new mapping to indicate a relationship between the logical address and the allocated physical page. At 645, the process transfers the application data received via the SET call to the allocated physical page on a flash memory structure.

Figure 7A:
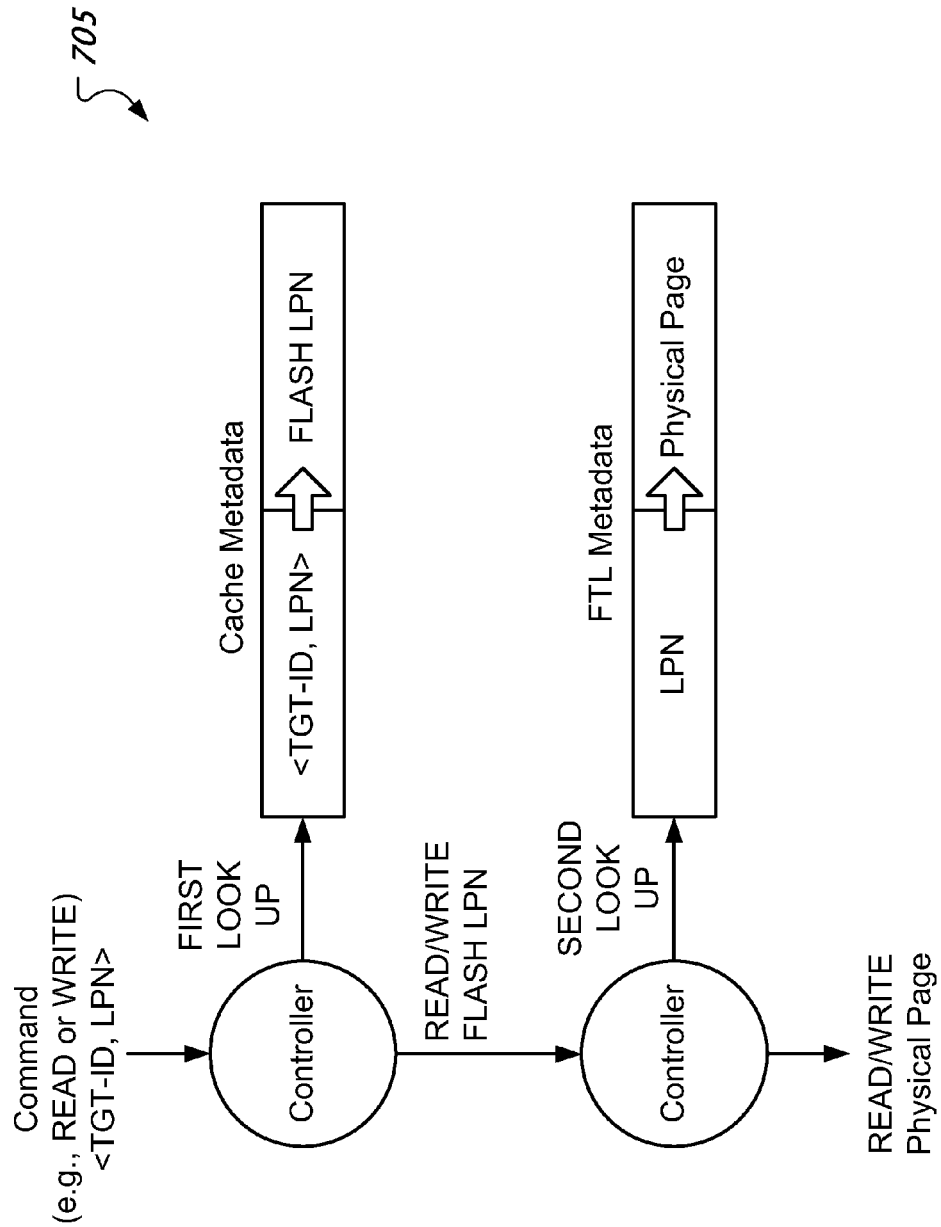
FIGS. 7A and 7B show examples of different cache processes.
Figure 7B:
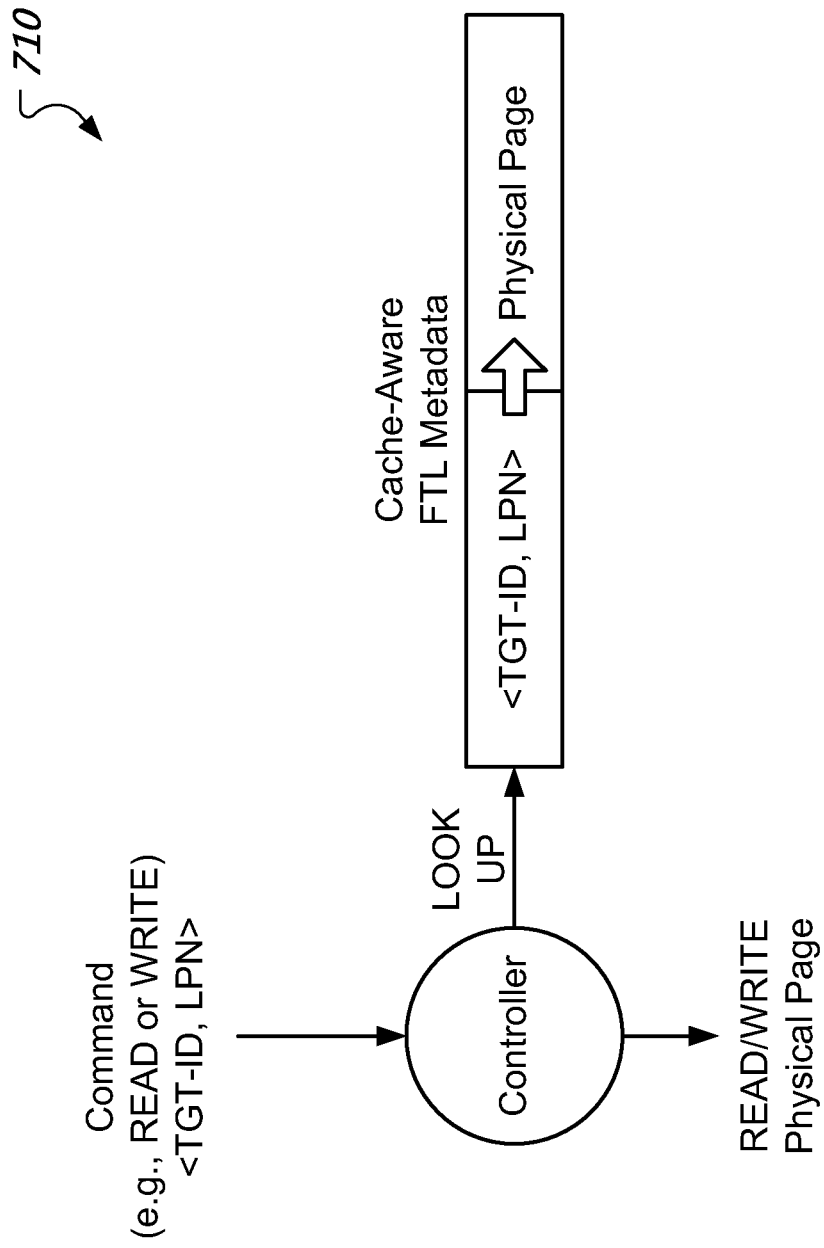

FIGS. 7A and 7B show examples of different cache processes. The cache process 705 depicted by FIG. 7A includes two look-ups, whereas the cache process 710 depicted by FIG. 7B includes one look-up. A cache process that uses less look-ups can provide better performance over a cache process that uses more look-ups. Examples of better performance include reduced latency, reduced complexity, or both.

The cache process 705 depicted by FIG. 7A includes receiving a command that includes a logical address, e.g., <TGT-ID, LPN>. The process 705 includes performing a first look-up on the logical address to obtain a LPN of page in a cache memory such as a flash memory. The process 705 includes performing a second look up on the LPN to obtain a physical address of a physical page. The process 705 includes performing a read from or write to the physical page.

The cache process 710 depicted by FIG. 7B includes receiving a command that includes a logical address. The process 710 includes performing a look-up on the logical address to obtain a physical address of page in a cache memory such as a flash memory. The process 710 includes performing a read from or write to the physical page. The process 710 can access cache-aware FTL metadata that includes a mapping table associating logical addresses, e.g., <TGT-ID, LPN>, with physical addresses of physical pages.

A cache-aware FTL can respond to commands such as an INVALIDATE command. Responding to such a command can include removing one or more associated mappings (e.g., {<TGT-ID, LPN> <=> physical page}) from the FTL's mapping table. A mapping table may have multiple mappings that are associated with the same logical address as a result of previous page invalidations. Removing such mappings can increase flash memory space utilization and can decrease a garbage collector's processing load.

In some implementations, a cache controller uses flash memory as a write-back cache. The cache controller can reserve some space in the flash memory as a buffer space. This buffer space can be used to match up a higher incoming I/O rate with a lower cache replacement rate. In some implementations, a FTL can reserve space in the flash memory for a garbage collection process to allow the process to catch up with an incoming I/O data stream if such a scenario arises.

A cache-aware FTL can reserve less space when compared to a FTL that is not cache-aware. This is because as caching logic starts invalidating cache blocks, the corresponding physical pages also start becoming invalid, which hence become candidates for erasing. A garbage collector can directly use these invalid pages to produce pages for allocation. However, in some implementations, a cache-aware FTL is not required to reserve space.

In some implementations, a storage controller can use two or more caching devices to cache data from storage devices. A storage controller can distribute data caching across multiple caching devices. In some implementations, a storage controller can use a hash function that maps the tuple <TGT-ID, offset, length> to a cache device. The cache device that is identified by an output of the hash function can be used for operations (e.g., GET, SET, INVALIDATE) for that tuple.

Figure 8:
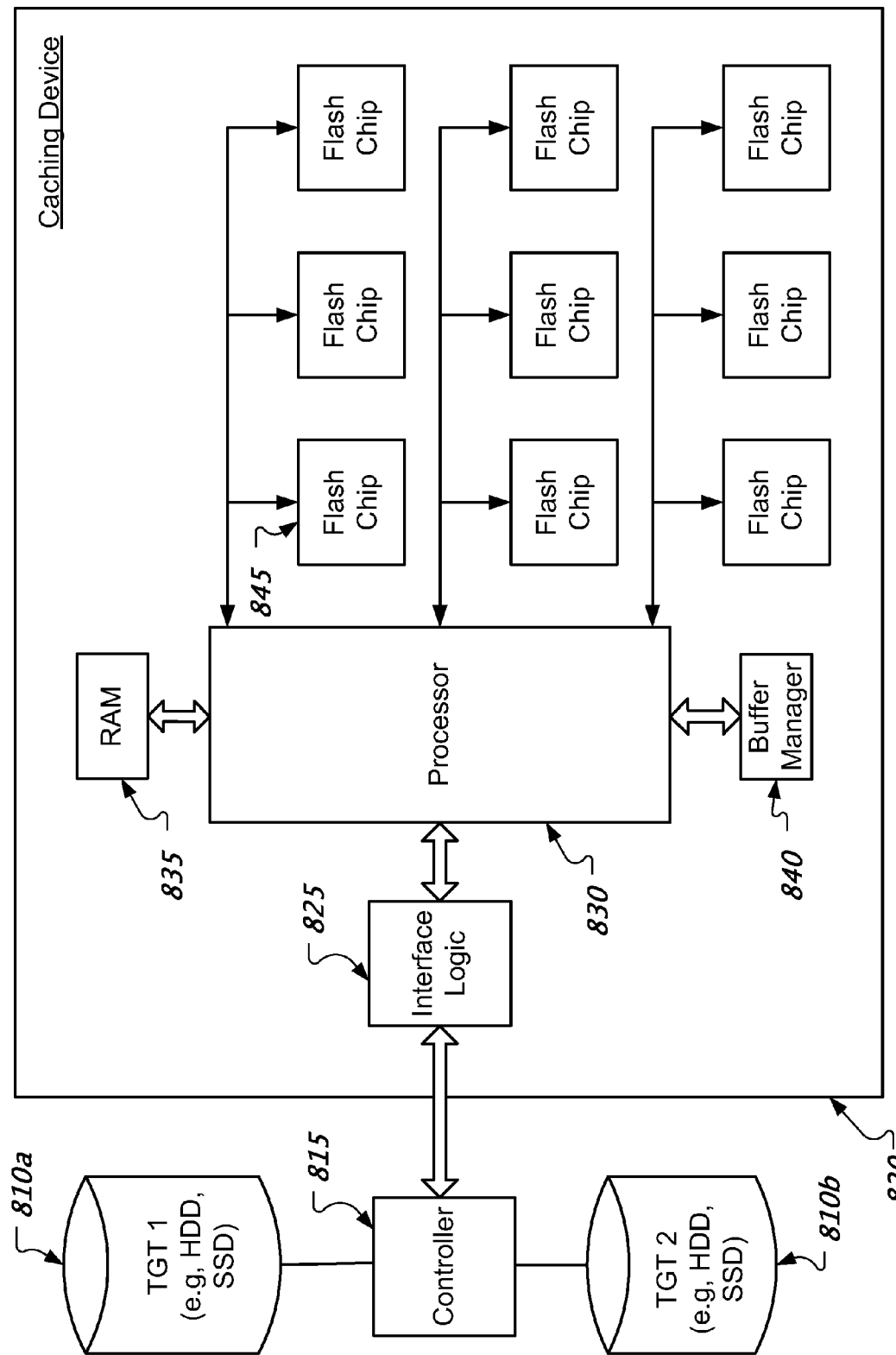
FIG. 8 shows an example of a storage system with multiple flash memory structures.

FIG. 8 shows an example of a storage system with multiple flash memory structures. A storage system can include data storage devices 810a, 810b such as a HDD, SSD, or a combination thereof. A controller 815 can write and read data to the data storage devices 810a, 810b. A controller 815 can communicate with one or more caching devices 820. A caching device 820 includes memory to cache data such as one or more flash memory structures, e.g., one or more flash chips 845. The caching device 820 can include interface logic 825, a processor 830, a random access memory (RAM) 835, and a buffer manager 840

Figure 9:
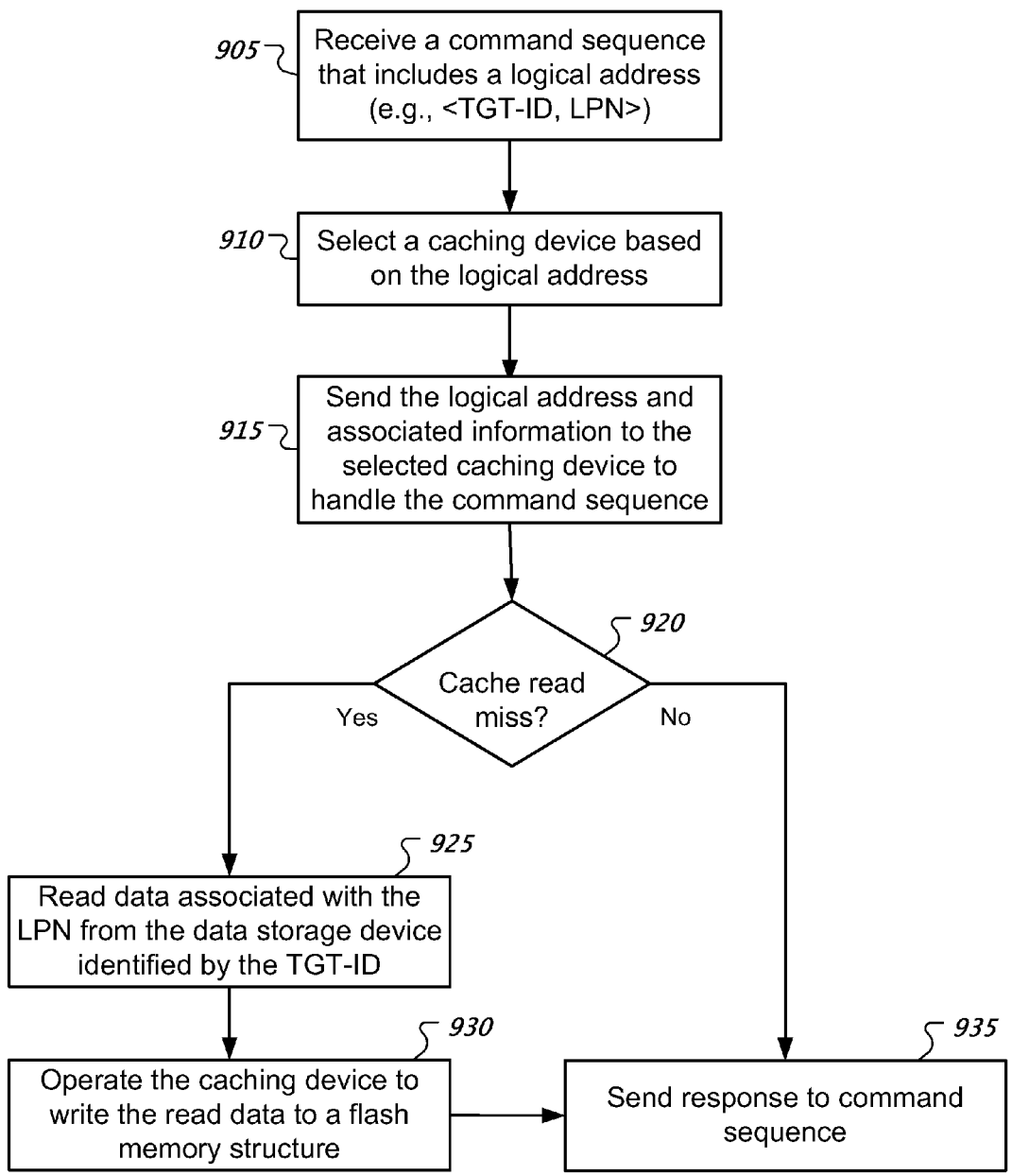
FIG. 9 shows an example of a storage process.

FIG. 9 shows an example of a storage process. At 905, a storage controller can receive a command sequence that includes a logical address (e.g., <TGT-ID, LPN>). At 910, a storage controller can select a caching device based on the logical address. Selecting a caching device can include applying a hash function to the logical address to produce an identifier of a caching device. At 915, the storage controller can send the logical address and associated information to the selected caching device to handle the command sequence. At 920, if there is a cache read miss, then at 925, the storage controller can read data associated with the LPN from the data storage device identified by the TGT-ID. At 930, the storage controller can operate the caching device to write the read data to a flash memory structure. At 935, the storage controller can send a response to the command sequence. For a cache read miss, the response can include data retrieved from the storage device.

At 920, if there is not a cache read miss, then the storage controller can send a response to the command sequence at 935. For a write command sequence, the response can include a status, e.g., write was successful.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. An apparatus, comprising:
  a flash memory structure;
  circuitry to receive a command sequence that includes a logical address, wherein the logical address includes (i) information that identifies a data storage device from among two or more separate data storage devices and (ii) a logical page number within the identified data storage device;
  circuitry to receive data associated with the logical address;
  circuitry to allocate a physical page in the flash memory structure;
  circuitry to store a mapping from the logical address to a physical address associated with the physical page;
  circuitry to write, based on the physical address, the data associated with the logical address to the flash memory structure to cache the data associated with the logical address; and
  circuitry to (i) invalidate the physical page in the flash memory structure based on the logical address being included in an invalidate command sent by an application to indicate caching of the data associated with the logical address is no longer needed and (ii) allow a garbage collector to directly use the physical page when performing an erasure to make the physical page available for re-allocation;
  wherein the mapping indicates a cached status of the data associated with the logical address; and
  wherein the mapping goes from the logical address to the physical address without an intervening reference to a logical page number (LPN) of the flash memory structure.

2. The apparatus of claim 1, comprising:
  circuitry to receive a read command sequence that includes a logical address;
  circuitry to identify a physical address associated with the logical address of the read command sequence; and
  circuitry to read, based on the identified physical address, data from the flash memory structure to provide cached data associated with the logical address of the read command sequence.

3. The apparatus of claim 1, wherein the flash memory structure is used as a write-back cache, has less than 25% of its total capacity reserved specifically for garbage collection, and has less than 40% of its total capacity reserved for both garbage collection and buffer space.

4. The apparatus of claim 1, wherein the flash memory structure comprises two or more cache devices, and wherein the circuitry to allocate comprises circuitry to select a cache device from among the two or more cache devices based on the logical address.

5. The apparatus of claim 4, wherein the circuitry to select comprises circuitry to apply a hash function to a {target-ID, offset, length} tuple to produce an identifier of the cache device from among the two or more cache devices.

6. A method, comprising:
  receiving, from a host system, information that includes a logical address, wherein the logical address comprises (i) a target device identifier for one of two or more separate data storage devices and (ii) a logical block address (LBA) within a single data storage device identified by the target device identifier;
  receiving data associated with the logical address from one of the host system or a data storage device of the two or more separate data storage devices;
  allocating a physical page in a flash memory structure, wherein the flash memory structure is configured to cache data for the two or more separate data storage devices;
  storing a mapping from the logical address to a physical address of the physical page;
  writing, based on the physical address, the data associated with the logical address to the flash memory structure to cache the data associated with the logical address;
  invalidating the physical page in the flash memory structure based on the logical address being included in an invalidate command sent by an application to indicate caching of the data associated with the logical address is no longer needed; and allowing a garbage collector to directly use the physical page when performing an erasure to make the physical page available for re-allocation;

wherein the mapping indicates a cached status of the data associated with the logical address; and wherein the mapping goes directly from the logical address to the physical address.

7. The method of claim 6, wherein receiving data associated with the logical address comprises reading data from the single data storage device based on the logical address.

8. The method of claim 6, wherein the flash memory structure is used as a write-back cache, has less than 25% of its total capacity reserved specifically for garbage collection, and has less than 40% of its total capacity reserved for both garbage collection and buffer space.

9. The method of claim 6, wherein the flash memory structure comprises two or more caching devices, the method comprising:

selecting a caching device from among the two or more caching devices based on the logical address, wherein writing data to the flash memory structure comprises communicating with the selected caching device.

10. The method of claim 9, wherein selecting the caching device comprises applying a hash function to a {target-ID, offset, length} tuple to produce an identifier of the caching device from among the two or more caching devices.

11. The method of claim 6, wherein the two or more separate data storage devices comprise two or more hard disk drives.

\* \* \* \* \*